(12) United States Patent
Ashida et al.

(10) Patent No.: US 7,556,030 B2
(45) Date of Patent: Jul. 7, 2009

(54) SPARK IGNITION TYPE INTERNAL COMBUSTION ENGINE

(75) Inventors: Koichi Ashida, Kanagawa (JP); Toru Noda, Kanagawa (JP); Isamu Hotta, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/043,323

(22) Filed: Mar. 6, 2008

(65) Prior Publication Data

US 2008/0228375 A1 Sep. 18, 2008

(30) Foreign Application Priority Data

Mar. 12, 2007 (JP) ............................. 2007-061532

(51) Int. Cl.
*G01N 33/22* (2006.01)
(52) U.S. Cl. .................. 123/575; 123/1 A; 123/406.3; 123/577; 73/35.02
(58) Field of Classification Search ............... 123/1 A, 123/406.3, 575, 577; 73/35.02
See application file for complete search history.

(56) References Cited

U.S. PATENT DOCUMENTS

| | | | | |
|---|---|---|---|---|
| 3,520,173 A | * | 7/1970 | Hadley | 73/35.02 |
| 4,402,212 A | * | 9/1983 | Childs | 73/35.02 |
| 5,457,985 A | * | 10/1995 | Cellier et al. | 73/35.02 |
| 6,609,413 B1 | * | 8/2003 | De Craecker | 73/35.02 |
| 7,246,596 B2 | * | 7/2007 | Yamaguchi et al. | 123/299 |
| 2004/0182378 A1 | * | 9/2004 | Oshimi et al. | 123/685 |
| 2007/0079647 A1 | * | 4/2007 | Aoyama | 73/35.02 |
| 2007/0119425 A1 | * | 5/2007 | Lewis et al. | 123/478 |

FOREIGN PATENT DOCUMENTS

JP 2005-2914 1/2005

* cited by examiner

*Primary Examiner*—Erick Solis
(74) *Attorney, Agent, or Firm*—Drinker Biddle & Reath LLP

(57) ABSTRACT

A spark-ignition type internal combustion engine, including a main tank for storing a to-be-determined fuel having an unknown self-ignition property, an auxiliary tank for accumulating a reference fuel having a known self-ignition property, and a controller. The controller is programmed to supply to a combustion chamber a blended fuel prepared by blending the to-be-determined fuel and the reference fuel at a predetermined ratio, measure a self-ignition property of the blended fuel, and determine the unknown self-ignition property of the to-be-determined fuel based on the measured self-ignition property of the blended fuel, the known self-ignition property of the reference fuel and the ratio of the blended fuel. The controller is also programmed to introduce the to-be-determined fuel after the determination from the main tank to the auxiliary tank, and store the to-be-determined fuel in the auxiliary tank such that the to-be-determined fuel serves as a next reference fuel having a known self-ignition property.

20 Claims, 10 Drawing Sheets

SPARK IGNITION TYPE INTERNAL COMBUSTION ENGINE

CROSS-REFERENCE TO RELATED APPLICATIONS

This application claims priority to Japanese Patent Application No. 2007-061532, filed Mar. 12, 2007, the disclosure of which is incorporated by reference herein in the entirety.

BACKGROUND OF THE INVENTION

1. Field of the Invention

The present invention relates to a spark ignition type internal combustion engine which determines (estimates) the self-ignition property of a fuel whose property is unknown.

2. Description of Related Art

Determining the self-ignition property (i.e. characteristic indicating the self-ignition property represented by octane number or cetane number) of a fuel using knocking determination (i.e. measurement of knocking limit ignition timing) is a well-known technology in the field of the spark ignition type internal combustion engine. Such determining has been widely used in discriminating high-octane gasoline from regular gasoline.

A related art spark ignition type internal combustion engine includes two kinds of fuels different in octane number that are blended and supplied to a combustion chamber. In the internal combustion engine, the octane number of a low octane fuel is measured, and then the two kinds of fuels are blended to measure the octane number of the blended fuel. The octane number of a high octane fuel is measured according to these octane numbers and a mixture ratio of the two kinds of the fuels.

According to the related art engine, each time when a fuel having an unknown octane number is supplied, the octane numbers of two kinds of fuels need to be determined. If the knocking is determined upon only the low octane fuel, there occurs such a problem that the knocking is intensified when a fuel having an extremely low octane number is supplied.

BRIEF SUMMARY OF THE INVENTION

In view of such a circumstance, an object of the present invention is to provide a spark ignition type internal combustion engine capable of determining the self-ignition property of a fuel in a simple way.

In an embodiment, the invention provides a spark-ignition type internal combustion engine, including a main tank for storing a to-be-determined fuel having an unknown self-ignition property, an auxiliary tank for accumulating a reference fuel having a known self-ignition property, and a controller. The controller is programmed to supply to a combustion chamber a blended fuel prepared by blending the to-be-determined fuel and the reference fuel at a predetermined ratio, measure a self-ignition property of the blended fuel, and determine the unknown self-ignition property of the to-be-determined fuel based on the measured self-ignition property of the blended fuel, the known self-ignition property of the reference fuel and the ratio of the blended fuel. The controller is also programmed to introduce the to-be-determined fuel after the determination from the main tank to the auxiliary tank, and store the to-be-determined fuel in the auxiliary tank such that the to-be-determined fuel serves as a next reference fuel having a known self-ignition property.

In another embodiment, the invention provides a fuel property determining method for a spark-ignition type internal combustion engine, the engine including a main tank for storing a to-be-determined fuel having an unknown self-ignition property and an auxiliary tank for accumulating a reference fuel having a known self-ignition property. The method including supplying to a combustion chamber a blended fuel prepared by blending the to-be-determined fuel having the unknown self-ignition property and the reference fuel having the known self-ignition property at a predetermined ratio, measuring a self-ignition property of the blended fuel, and determining the unknown self-ignition property of the to-be-determined fuel based on the measured self-ignition property of the blended fuel, the known self-ignition property of the reference fuel and the ratio of the blended fuel.

According to the present invention, even if a fuel having an unknown self-ignition property is supplied, the reference fuel having a known self-ignition property accumulated in the auxiliary tank is used as one of the blended fuel. Consequently, the self-ignition property of each of the two kinds of the fuels do not need to be determined each time when a fuel having an unknown self-ignition property is supplied.

Even if a fuel having an extremely low octane number is supplied, knocking is not intensified when the self-ignition property is determined using only the fuel having the extremely low octane number. This is because the self-ignition property of the supplied fuel is determined by blending it with the reference fuel having a known self-ignition property accumulated in the auxiliary tank.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Hereinafter, embodiments of the present invention will be described with reference to the accompanying drawings.

Figure 1:
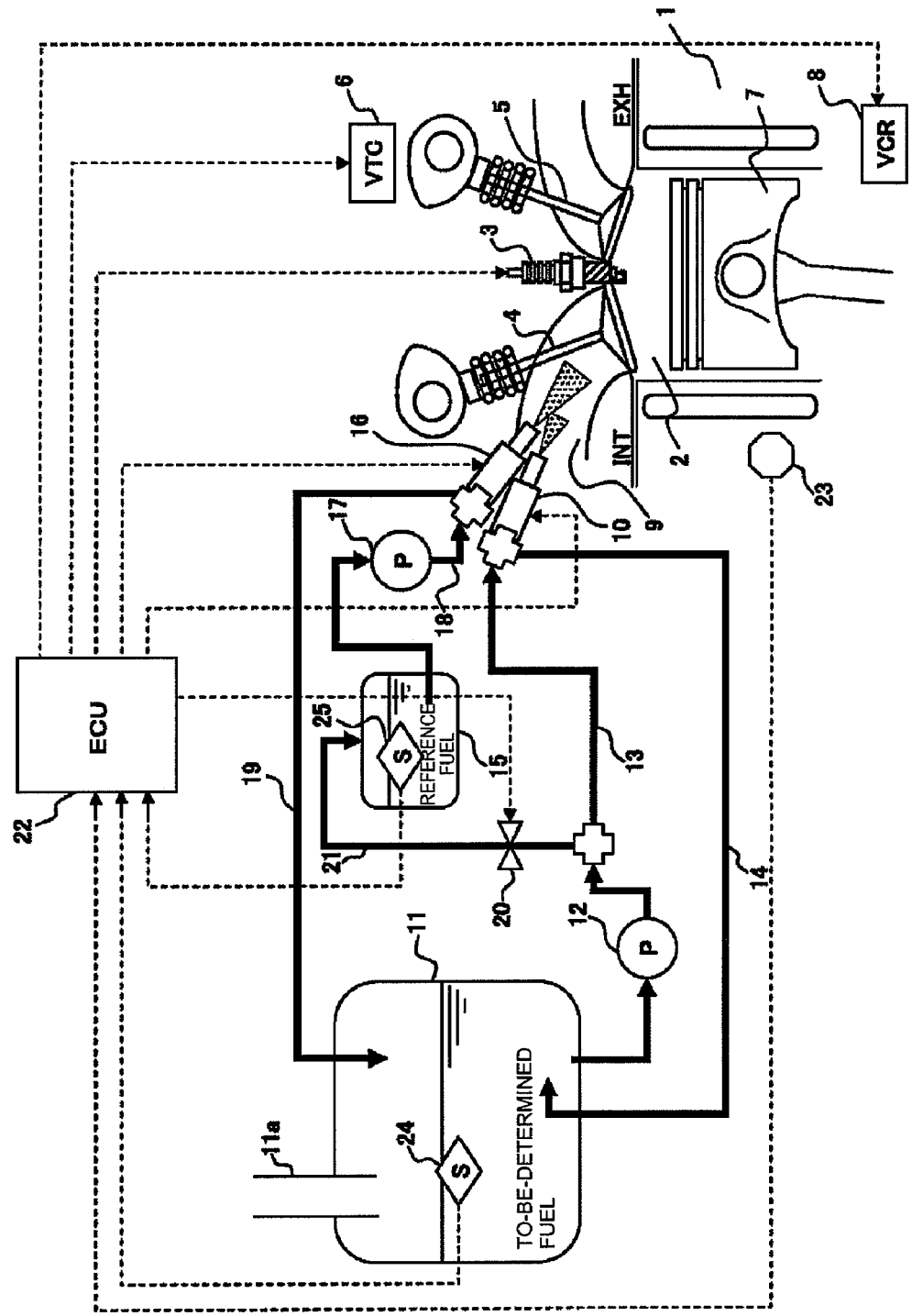
FIG. 1 is a system diagram of an internal combustion engine according to a first embodiment of the present invention.

FIG. 1 is a system diagram showing a fuel supply system of an internal combustion engine according to a first embodiment of the present invention.

The internal combustion engine 1 is a spark ignition type internal combustion engine having an ignition plug 3 within a combustion chamber 2. The internal combustion engine 1 also includes a variable valve timing mechanism (VTC) 6 capable of changing a valve timing of an intake valve 4 and an exhaust valve 5. Additionally, the internal combustion engine 1 includes a variable compression ratio mechanism (VCR) 8 capable of changing a compression ratio by changing the stroke amount of a piston 7.

A fuel is supplied to the internal combustion engine 1 by a fuel injection valve 10 disposed in an intake passage (intake port) 9. A fuel contained in a main tank 11 is supplied to the fuel injection valve 10 by a fuel pump 12 through a fuel passage 13, and excessive fuel is returned to the main tank 11 by a return passage 14.

A main tank 11 has a supply port 11a which can be opened/closed and stores a fuel whose property is unknown (i.e. a to-be-determined fuel) when the fuel is supplied from outside.

To determine the self-ignition property of the fuel in the main tank 11, an auxiliary tank 15 for containing a reference fuel whose self-ignition property has been already known is provided. The intake passage (intake port) 9 is provided with a fuel injection valve 16 capable of injecting the reference fuel beside the fuel injection valve 10 for normal operation. The reference fuel in the auxiliary tank 15 is supplied to the fuel injection valve 16 by a fuel pump 17 through a fuel passage 18 and excessive fuel is returned to the main tank 11 through a return passage 19.

The auxiliary tank 15 communicates with the main tank 11 through a control valve (normally-closed electromagnetic on-off valve) 20. More specifically, a fuel passage 21 is branched from the fuel passage 13 between the fuel pump 12 for feeding the fuel from the main tank 11 and the fuel injection valve 10. The duel passage 21 is connected to the auxiliary tank 15 through the control valve 20.

Operation of the fuel injection valve 16 and the control valve 20 as well as the fuel injection valve 10, the ignition plug 3, the variable valve timing mechanism 6 and the variable compression ratio mechanism 8 are controlled by an engine control unit (ECU) 22.

Signals relating to the operating conditions (e.g. accelerator opening, engine revolution number and the like) are input to the ECU 22 from various sensors (not shown). In addition, additional signals are input therein from a knocking sensor 23 for detecting knocking based on vibration of a specific frequency of the internal combustion engine 1, a level sensor 24 for detecting an amount of fuel (i.e. liquid level) in the main tank 11 and a level sensor 25 for detecting an amount of fuel (i.e. liquid level) in the auxiliary tank 15.

Next, determination of the self-ignition property (in particular, the octane number as the self-ignition property index) of a to-be-determined fuel within the main tank 11 will be described. First, the principle for determination will be explained.

Assume that an octane number of a to-be-determined fuel and an octane number of a reference fuel are Ox and Oy respectively. The octane number Oz of a blended fuel prepared by blending these fuels at a predetermined ratio "a" can be expressed according to the following equation:

$$Oz = Ox \cdot a + Oy \cdot (1-a)$$

where the ratio "a" is a ratio of the to-be-determined fuel in the blended fuel (total fuel) and (1−a) is a ratio of the reference fuel in the blended fuel.

From this equation, $Ox = (Oz - Oy \cdot (1-a))/a$ is established. As a result, the octane number Ox of the to-be-determined fuel can be calculated from the octane number Oz of the blended fuel, the octane number Oy of the reference fuel and the aforementioned ratio.

Because the octane number Oy of the reference fuel is already known, the octane number Ox of the to-be-determined fuel can be estimated by measuring the octane number Oz of the blended fuel at the ratio "a".

Figure 2:
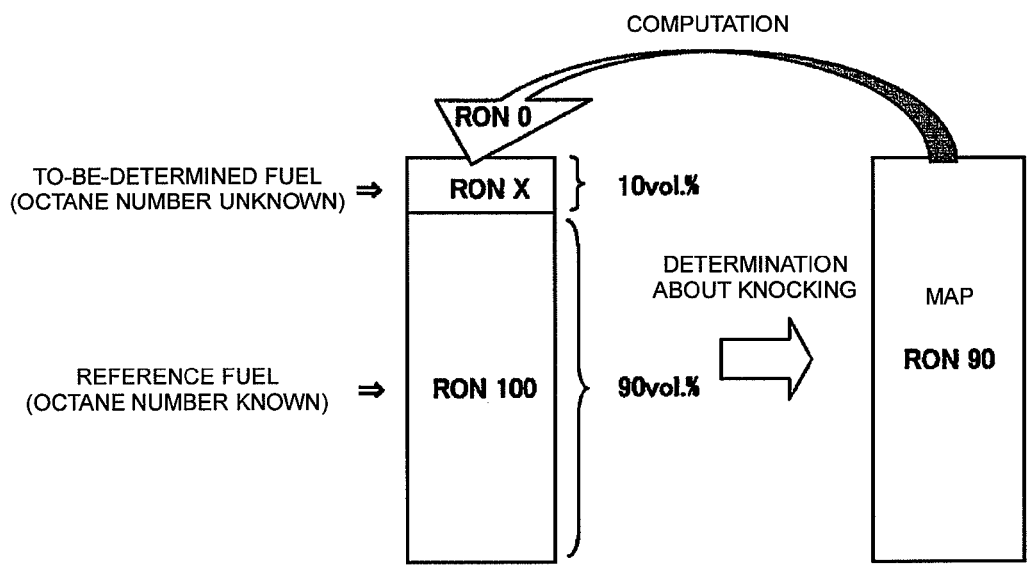
FIG. 2 is an explanatory diagram of the principle for determining a fuel self-ignition property (e.g. octane number)

If the octane number of the reference fuel is known and RON is 100 as shown in, for example, FIG. 2, RON may be 90 as a result of estimating the octane number of the blended fuel by knocking determination (i.e. measurement of knocking limit ignition period), with the ratio of the reference fuel as 90 vol. % and the ratio of the to-be-determined fuel whose octane number is unknown as 10 vol. %. In this case, the octane number of the determination object fuel is RON:0.

When the engine is operated with only a to-be-determined fuel for determination of knocking, the knocking can be determined accurately by reducing the ratio of the to-be-determined fuel even if the self-ignition property is too high.

Next, determination of the self-ignition property (octane number) of the to-be-determined fuel within the main tank 11 will be described with reference to the flow chart of FIG. 3.

In step 1 (in the diagram, noted as S1), it is determined whether or not the determination condition for the self-ignition property has been established (whether or not a determination mode is selected).

Upon determining of the fuel in the main tank 11, first it is determined that supply of fuel occurs by using a fuel supply determining unit which determines whether or not a fuel is supplied to the main tank 11, because the property of the fuel becomes unknown by supply of fuel. Thereafter, the self-ignition property is determined when the engine is started.

The fuel supply determining unit uses a device (e.g. level sensor 24) capable of measuring the amount of fuel in the main tank 11, and when a difference between a fuel amount when the engine is started and a fuel amount when the engine is stopped exceeds a predetermined amount, it is determined that supply of fuel occurs. Where a device for detecting flow-in of fuel into the main tank 11 is provided, it is determined that supply of fuel occurs due to detection of the flow-in of fuel.

The determination of fuel needs to be carried out under a predetermined engine revolution number and load in order to improve the reliability of the self-ignition property determination, and it is most preferable to carry out determination at the time of idling operation if considering influence upon drivability.

Therefore, as a condition for determining the self-ignition property, it is determined whether or not the engine is started after it is determined that supply of fuel occurs and whether or not idling operation arises.

If the condition for determining the self-ignition property is established, the procedure proceeds to step 2.

In step 2, the to-be-determined fuel in the main tank 11 and the reference fuel in the auxiliary tank 15 are supplied by injection into the internal combustion engine 1 at a predetermined ratio (injection amount ratio) "a". More specifically, assuming that a required injection amount (required injection pulse width) is Ti, the fuel injection amount (injection pulse width) of the fuel injection valve 10 for the to-be-determined fuel is Ti·a and the fuel injection amount (injection pulse width) of the fuel injection valve 16 for the reference fuel is Ti·(1−a). The respective fuel injection valves 10, 16 inject the fuel.

The predetermined ratio "a" is preferred to be set so that the amount of the to-be-determined fuel is smaller than that of the reference fuel from the viewpoint of safety. For example, it is set to a=0.1 (10%).

In step 3, a knocking limit ignition period θz is measured under an operation with the blended fuel of the to-be-determined fuel and reference fuel in the step 2, the details of which are described later.

In step 4, a difference (difference of knocking limit ignition period) Δθ=θz−θy between the knocking limit ignition period θz (measured in the step 3) of the blended fuel, and the knocking limit ignition period θy (known) of the reference fuel, is obtained.

Figure 5:
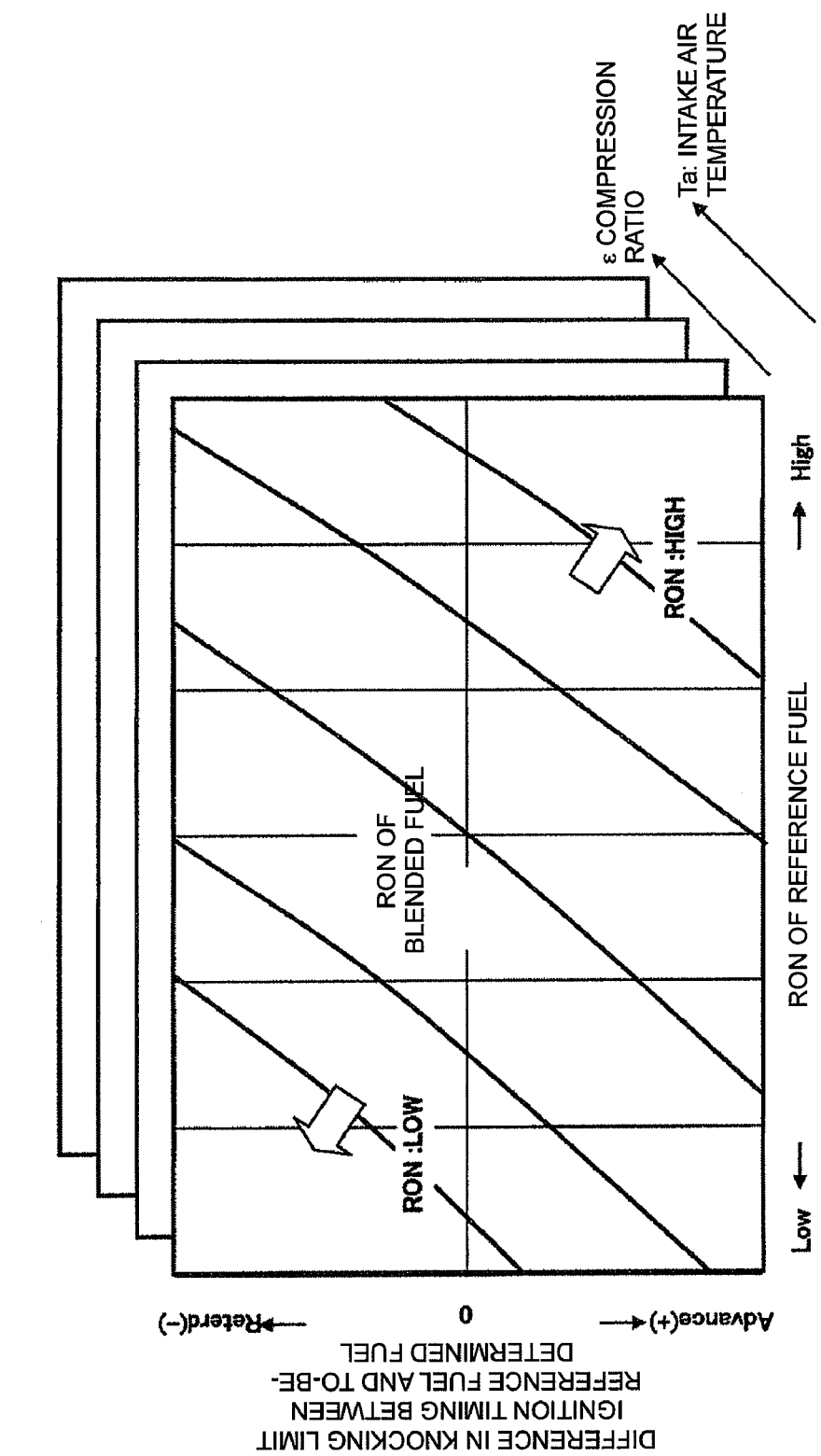
FIG. 5 is an explanatory diagram of a map for fuel self-ignition property determination.

In step 5, an octane number Oz of the blended fuel is estimated from the octane number Oy (known) of the reference fuel and the knocking limit ignition period Δθ (calculated in the step 4) with reference to a map shown in FIG. 5.

This map is prepared for each compression ratio ε and/or each intake air temperature Ta and a corresponding map is selected for use. Because the knocking phenomenon indicates a strong correlation with the compression ratio ε and the intake air temperature Ta, the determination accuracy can be improved by correcting the map with these factors.

In step 6, an octane number Oz of the to-be-determined fuel is calculated from the octane number (estimated in the step 5) of the blended fuel, the octane number Oy (known) of the reference fuel and the ratio "a" (set in the step S2) according to the following equation.

$$Ox=(Oz-Oy\cdot(1-a))/a$$

The determination of the self-ignition property of the to-be-determined fuel in the main tank 11 is completed and the procedure proceeds to step 7 (processing after completion).

In step 7, as the processing after completion, (1) a fuel for use is changed over to the to-be-determined fuel; (2) the operating condition is changed corresponding to a determined octane number Ox; and (3) the to-be-determined fuel is stored in the auxiliary tank 15 as a reference fuel.

That is, because the octane number Ox of the to-be-determined fuel is made evident after the self-ignition property is determined, the fuel injection is switched to operate only the fuel injection valve 10 for the to-be-determined fuel, by stopping the fuel injection of the fuel injection valve 16 for the reference fuel. By decreasing the fuel injection amount of the fuel injection valve 16 for the reference fuel step by step (or continuously) and increasing the fuel injection amount of the fuel injection valve 10 for the to-be-determined fuel step by step (or continuously), the ratio of the to-be-determined fuel (main tank fuel) with respect to the total fuel is increased to switch to operation with the to-be-determined fuel. Consequently, the switch-over of the fuel can be carried out smoothly.

Figure 6:
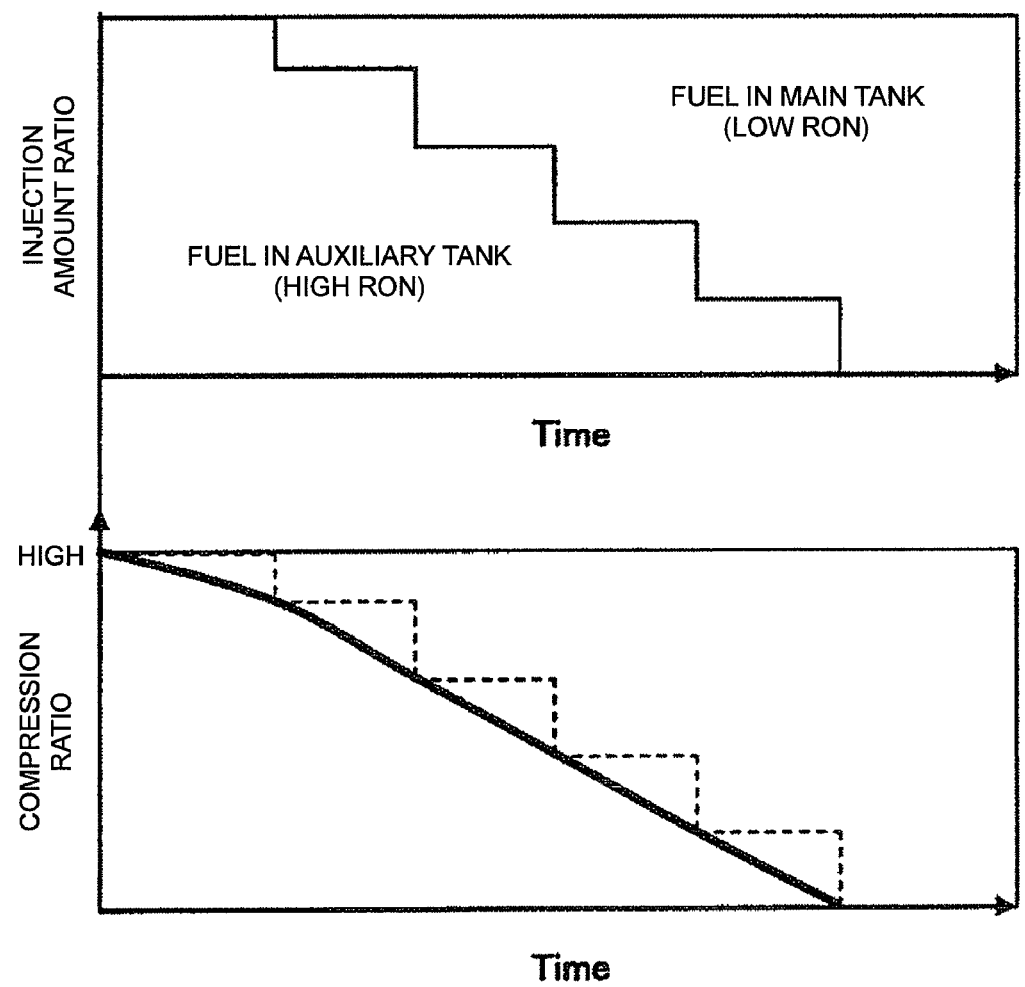
FIG. 6 is an explanatory diagram of fuel change over and operation condition change.

The operating condition of the internal combustion engine 1 is changed to an optimum condition corresponding to the octane number Ox of the to-be-determined fuel after determination (fuel for use). More specifically, if the variable compression ratio mechanism 8 is provided, the compression ratio is changed to a value suitable for the self-ignition property of the used fuel. If the variable valve timing mechanism 6 is provided, the valve timing is changed to a timing suitable for the self-ignition property of the used fuel. Further, the ignition timing and throttle opening characteristic, etc. are changed to values suitable for the self-ignition property of the used fuel. Consequently, under an operating condition optimized for a new fuel, excellent output, fuel cost performance and exhaust performance can be obtained. In the meantime, when switching over of the fuel is carried out gradually, it is preferable to switch over the compression ratio also gradually as shown in FIG. 6. Because the reference fuel having a high octane number is changed over to the to-be-determined fuel having a low octane number in FIG. 6, the compression ratio of the variable compression ratio mechanism is switched over gradually from high to low.

Because the reference fuel having a known self-ignition property is accumulated in the auxiliary tank 15 for the next self-ignition property determination, the control valve 20 is opened to introduce the to-be-determined fuel having a known self-ignition property in the main tank 11 into the auxiliary tank 15 as the reference fuel and to store the fuel therein. If the reference fuel is left in the auxiliary tank 15, it is returned to the main tank 11 through the return passage 19 by operating the fuel pump 17 with the fuel injection valve 16 closed. In this case, changes in the property of the fuel within the main tank 11 is not so serious a problem because the capacity of the auxiliary tank 15 is much smaller than the capacity of the main tank 11.

By constructing the auxiliary tank 15 to communicate with the main tank 11 for the to-be-determined fuel through the control valve 20 so that the fuel having a known self-ignition property after the self-ignition property determination is completed is stored, the reference fuel can be always secured and the determination of the self-ignition property can be carried out even if a fuel having an unknown characteristic is loaded when the fuel is supplied via supply part 11a.

Processing of steps 2 to 4 of the flow chart of FIG. 3 will be explained further in detail with reference to the flow chart of FIG. 4.

In step 21, as the initial setting, the injection amount ratio "a" of the to-be-determined fuel with respect to the total fuel=a1, the ignition timing θ=θm, and the compression ratio ε=εm are set. Further, the intake air temperature Ta is detected with an intake air temperature sensor (not shown) and stored.

The engine is operated in this state and in step 31, whether or not knocking occurs is determined using a knocking sensor.

If it is determined that knocking occurs in step 31, the procedure proceeds to step 32, in which a result of previous knocking determination is investigated. If the knocking was found at the previous time, the procedure proceeds to step 33, in which the ignition timing is retarded (θ=θ−C; where C is a constant value) and the procedure returns to the knock determination of step 31.

If it is determined that no knocking occurs in step 31, the procedure proceeds to step 34, in which a result of the previous knocking determination is investigated. If it is determined that no knocking occurred at the previous time, the procedure proceeds to step 35, in which the ignition timing is advanced (θ=θ+C; where C is a constant value) and then, the procedure returns to the knocking determination in step 31.

If there is no result of the previous knocking determination (that is, first knocking determination), step 32 proceeds to step 33, and step 34 proceeds to step 35.

If it is determined that no knocking occurred in step 32 at the previous time, a status in which no knocking occurred at the previous time is changed to a status in which knocking occurs at this time (the previous status in which no knocking occurs is changed to the current status in which knocking occurs by advancing the ignition timing). The previous ignition timing is a knocking limit ignition timing. Therefore, in this case, the procedure proceeds to step 36, in which the knocking limit ignition timing is set to θz=θ−C.

If it is determined that knocking occurs in step 34 at the previous time, the status in which knocking occurred at the previous time is changed to the status in which no knocking occurs at this time (the previous status in which knocking occurs is changed to the current status in which no knocking occurs by retarding the ignition timing). The ignition timing at this time is a knocking limit ignition timing. Therefore, in this case, the procedure proceeds to step 37, in which the knocking limit ignition timing is set to θz =θ.

If during measurement of the knocking limit ignition timing, the knocking is not eliminated by retarding the ignition timing, that is, if the ignition timing θ exceeds a predetermined lag limit as a result of retarding the ignition timing in step 33, then the compression ratio ε may be decreased by the variable compression ratio mechanism 8 in step 38.

After completion of the measurement of the knocking limit ignition timing θz of the blended fuel in step 36 or 37, the procedure proceeds to step 41.

In step 41, a difference between the knocking limit ignition timing θz (established in the step 36 or 37) of the blended fuel, and the knocking limit ignition timing θy (known) of the reference fuel (difference in knocking limit ignition timing), Δθ=θz−θy is obtained.

The knocking limit ignition timing θy of the reference fuel for use here may be stored as a value under a standard condition (predetermined compression ratio, predetermined intake air temperature) and corrected with a current compression ratio or intake air temperature. Alternatively, the knocking limit ignition timing θz of the blended fuel may be corrected.

In step 42, it is determined whether or not the knocking limit ignition timing difference Δθ is larger than a predetermined value θclr. If it is smaller, a difference in octane number between the reference fuel and the to-be-determined fuel is small, so that the injection amount ratio "a" is too small. Thus, it is determined that the difference is not clear and then the procedure proceeds to step 43. In step 43, the injection amount ratio "a" of the to-be-determined fuel with respect to the total fuel is increased (a=a+da; where da is a constant value) and the procedure returns to step 31, in which measurement of the knocking limit ignition timing with a blended fuel having a new injection amount ratio "a" is executed again.

That is, the ratio between the to-be-determined fuel and the reference fuel may be changed arbitrarily. If a difference between the knocking limit ignition timing of the blended fuel and the knocking limit ignition timing of the reference fuel is a predetermined value or less, the ratio of the to-be-determined fuel is increased gradually to enable accurate determination.

When the determination of step 42 presents Δθ>clr, the knocking limit ignition timing Δθ is obtained. Then, the procedure proceeds to processing subsequent to step 5 of the flow chart in FIG. 3 with the knocking limit ignition timing difference Δθ, compression ratio ε, intake air temperature Ta, octane number Oy of the reference fuel and injection amount ratio "a".

In this embodiment, the self-ignition property of the blended fuel is estimated with reference to a map based on the self-ignition property of the reference fuel and the difference between the knocking limit ignition timing of the blended fuel and the knocking limit ignition timing of the reference fuel. Then, the self-ignition property of the to-be-determined fuel is estimated according to the expression based on the self-ignition property of the blended fuel, the self-ignition property of the reference fuel and the blending ratio. Alternatively, the self-ignition property of the to-be-determined fuel may be estimated with reference to the map based on the knocking limit ignition timing of the blended fuel, the self-ignition property of the reference fuel and the blending ratio.

Figure 7:
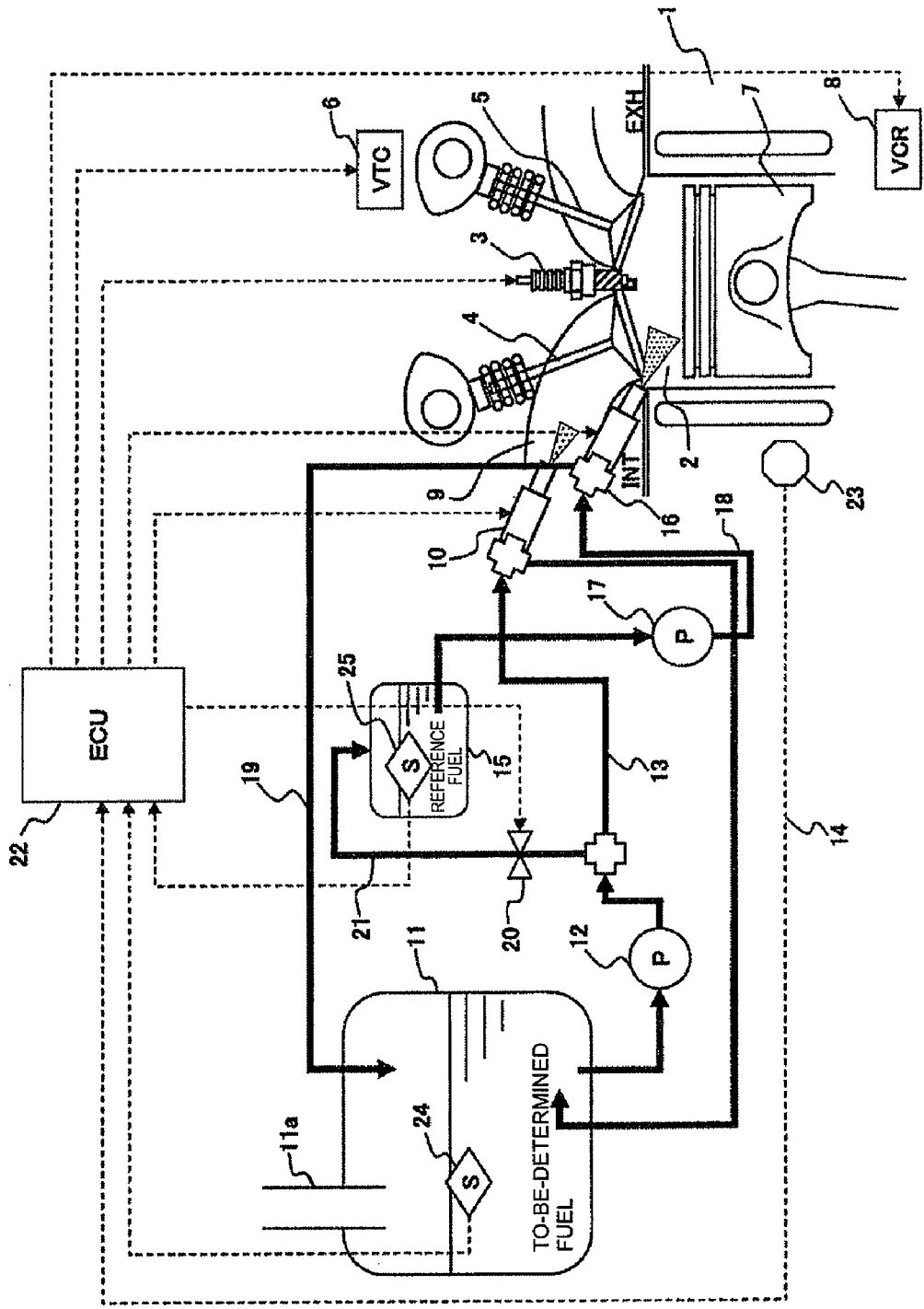
FIG. 7 is a system diagram of an internal combustion engine according to a second embodiment of the present invention.

Next, a second embodiment of the present invention will be described with reference to FIG. 7.

In the first embodiment (FIG. 1), the fuel injection valve 10 for the to-be-determined fuel and the fuel injection valve 16 for the reference fuel are disposed on the intake air passage (intake air port) 9. According to the second embodiment (FIG. 7), the fuel injection valve 10 for the to-be-determined fuel is disposed in the intake air passage (intake air port) 9 while the fuel injection valve 16 for the reference fuel is disposed within the combustion chamber 2.

On the premise of a direct fuel injection type internal combustion engine, it is permissible to dispose both the fuel injection valve 10 for the to-be-determined fuel and the fuel injection valve 16 for the reference fuel within the combustion chamber 2, or to dispose the fuel injection valve 10 for the to-be-determined fuel within the combustion chamber 2 while the fuel injection valve 16 for the reference fuel is disposed in the intake air passage (intake air port) 9.

If the fuel injection valve is disposed in the intake air passage 9, it may be provided on an intake air collector for all cylinders in common.

Figure 8:
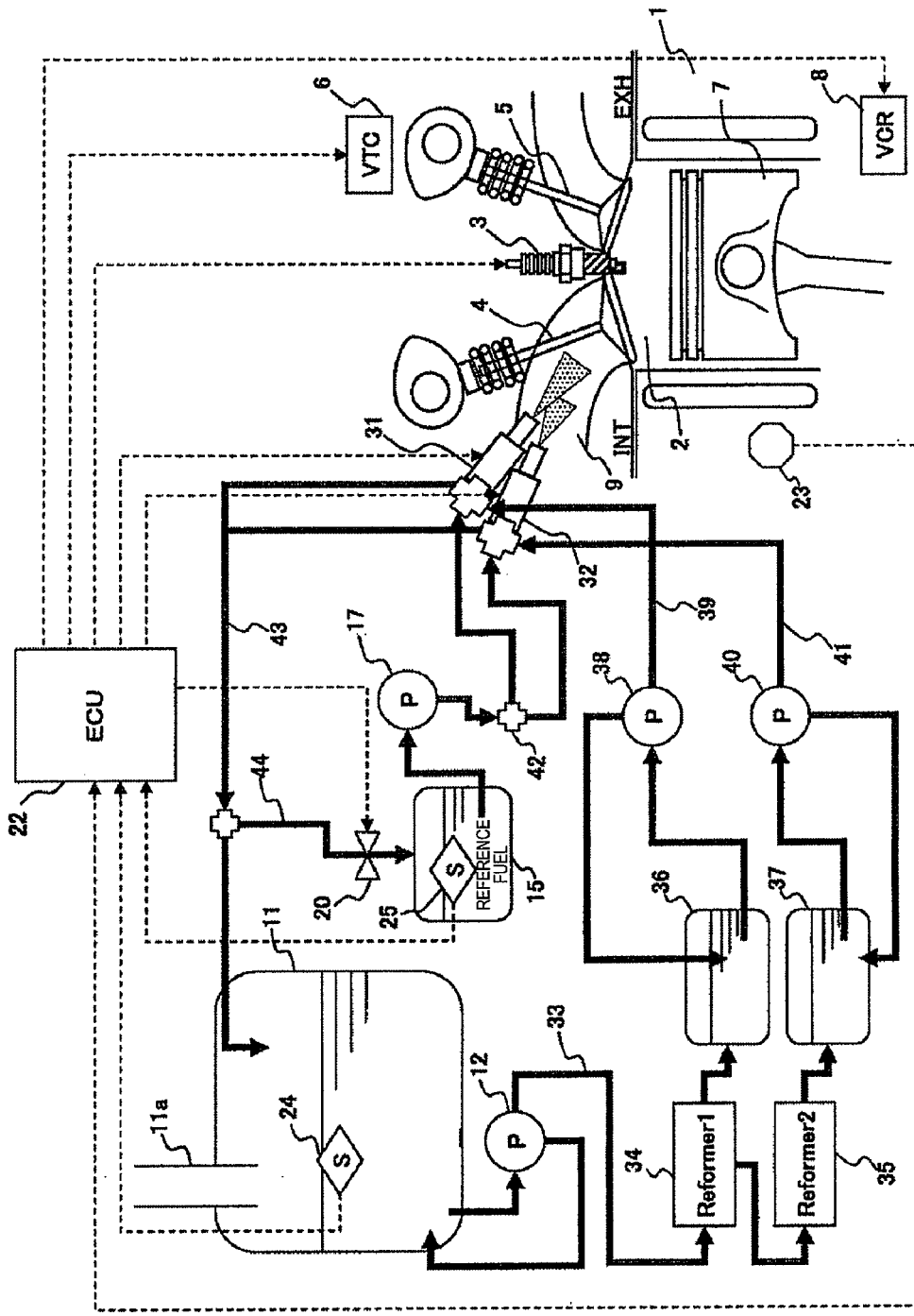
FIG. 8 is a system diagram of an internal combustion engine according to a third embodiment of the present invention.

Next, a third embodiment of the present invention will be described with reference to FIG. 8.

The third embodiment includes a reformer for reforming a fuel and can determine the self-ignition property of the reformed fuel when the reformed fuel reformed by the reformer is supplied to an internal combustion engine.

A fuel is supplied to the internal combustion engine 1 by first and second fuel injection valves 31, 32 disposed in the intake air passage 9.

Fuel in the main tank 11 is supplied to first and second reformers (reformation catalyst) 34, 35 by the fuel pump 12 through a fuel passage 33. The first reformer 34 generates a fuel having a relatively low self-ignition property (high octane number, low cetane number, hereinafter referred to as high octane number) by reforming the fuel, and the second reformer 35 generates a fuel having a relatively high self-ignition property (low octane number, high cetane number, hereinafter referred to as low octane) by reforming the fuel.

The reformed fuel (high octane fuel) generated by the first reformer 34 is stored in a first reformed fuel tank 36 and the reformed fuel (low octane fuel) generated by the second reformer 35 is stored in a second reformed fuel tank 37.

The fuel in the first reformed fuel tank 36 is supplied to the first fuel injection valve 31 by a fuel pump 38 through a fuel passage 39, and the fuel in the second reformed fuel tank 37 is supplied to the second fuel injection valve 32 by a fuel pump 40 through a fuel passage 41.

The ECU 22 selects any one (or at least one) of the reformed fuels corresponding to an operating condition (e.g. revolution number or load) of the internal combustion engine 1 so as to drive the corresponding fuel injection valve 31 or 32.

To determine the self-ignition property of the fuel in the first and second reformed fuel tanks 36, 37, the auxiliary tank 15 containing the reference fuel having a known self-ignition property is provided.

The fuel in the auxiliary tank 15 can be supplied to the first and second fuel injection valves 31, 32 by the fuel pump 17 through a distributor 42 having an on-off function. Therefore, the reformed fuel (high octane fuel) from the first reformed fuel tank 36 and the reference fuel are blended at a predetermined ratio in the fuel passage of the first fuel injection valve 31, so that the blended fuel can be injected. Further, the reformed fuel (low octane fuel) from the second reformed fuel tank 37 and the reference fuel are blended at a predetermined ratio in the fuel passage to the second fuel injection valve 32, so that the blended fuel can be injected.

Excessive fuel in the first and second fuel injection valves 31, 32 is returned to the main tank 11 through a return passage 43. A fuel passage 44 branched from the return passage 43 is connected to the auxiliary tank 15 through the control valve (normally-closed electromagnetic on-off valve) 20.

Therefore, to determine the self-ignition property (octane number) of the reformed fuel within the first reformed fuel tank 36, the blended fuel prepared by blending the reformed fuel and the reference fuel at a predetermined ratio is injected by the first fuel injection valve 31 to operate the engine. Then, a knocking limit ignition timing of the blended fuel is measured to determine the self-ignition property of the reformed fuel. After the determination is completed, the reformed fuel having a known self-ignition property is stored in the auxiliary tank 15 from a return passage 43 through the control valve 20.

Therefore, to determine the self-ignition property (octane number) of the reformed fuel within the second reformed fuel tank 37, the blended fuel prepared by blending the reformed fuel and the reference fuel at a predetermined ratio is injected by the second fuel injection valve 32 to operate the engine. Then, a knocking limit ignition timing of the blended fuel is measured to determine the self-ignition property of the reformed fuel. After the determination is completed, the reformed fuel having a known self-ignition property is stored in the auxiliary tank 15 from the return passage 43 through the control valve 20.

As a result, the self-ignition property of the reformed fuel generated in an internal combustion engine which changes the fuel characteristic using the reformer can be determined.

In case of reforming to fuels of two or more kinds, or generating fuels having a relatively high self-ignition property and a relatively low self-ignition property, the self-ignition property of each fuel can be determined.

Figure 9:
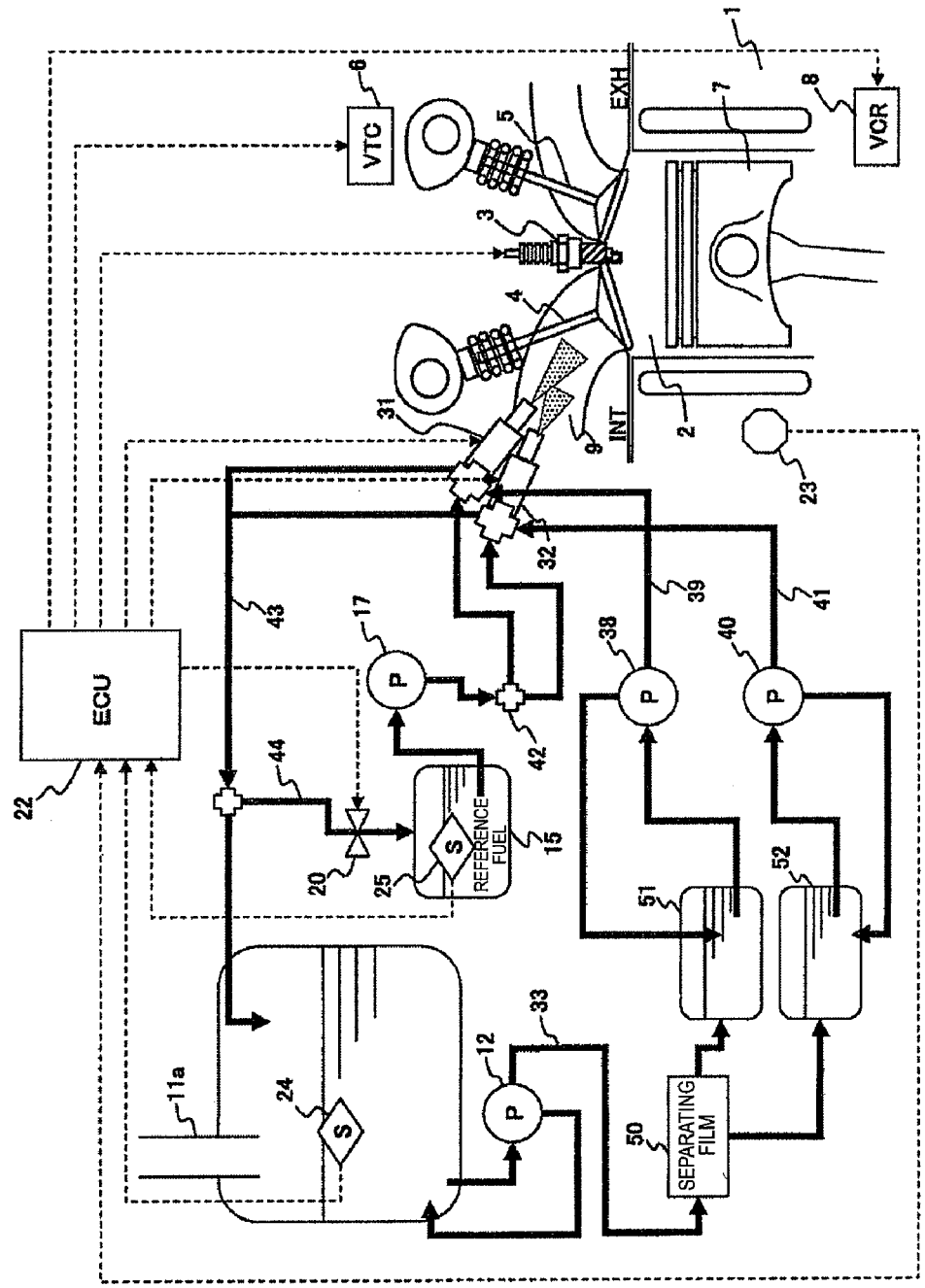
FIG. 9 is a system diagram of an internal combustion engine according to a fourth embodiment of the present invention.

Next, a fourth embodiment of the present invention will be described with reference to FIG. 9.

The fourth embodiment includes a separating unit for separating a fuel to two kinds of fuels and enables the self-ignition property of such separated fuels to be determined when the separated fuel separated by the separating unit is supplied to an internal combustion engine.

A fuel is supplied to the internal combustion engine 1 by first and second fuel injecting valves 31, 32 disposed in the intake air passage 9.

A fuel in the main tank 11 is supplied to a separating unit (separating film) 50 by the fuel pump 12 through the fuel passage 33. The separating unit 50 separates the fuel to generate a fuel having a relatively low self-ignition property (high octane number) and a fuel having a high self-ignition property (low octane number).

One separated fuel (high octane fuel) generated by the separating unit 50 is stored in a first separated fuel tank 51, and the fuel in the first separated fuel tank 51 is supplied to the first fuel injection valve 31 by the fuel pump 38 through the fuel passage 39.

The other reformed fuel (low octane fuel) generated by the separating unit 50 is stored in a second separated fuel tank 52 and the fuel in the second separated fuel tank 52 is supplied to the second fuel injection valve 32 by the fuel pump 40 through the fuel passage 41.

The ECU 22 selects any one (or at least one) of the separated fuels corresponding to an operating condition (e.g. revolution number or load) of the internal combustion engine 1 so as to drive the corresponding fuel injection valve 31 or 32.

To determine the self-ignition property of the fuel in the first and second separated fuel tanks 51, 52, the auxiliary tank 15 containing the reference fuel having known self-ignition property is provided.

A fuel in the auxiliary tank 15 can be supplied to the first and second fuel injection valves 31, 32 by the fuel pump 17 through the distributor 42 having an on-off function. Therefore, the fuel passage to the first fuel injection valve 31 enables the separated fuel (high octane fuel) from the first separated fuel tank 51 and the reference fuel to be blended at a. predetermined ratio and the blended fuel to be injected. Further, the fuel passage to the second fuel injection valve 32 enables the separated fuel (low octane fuel) from the second separated fuel tank 52 and the reference fuel to be blended at a predetermined ratio and the blended fuel to be injected.

Excessive fuel in the first and second fuel injection valves 31, 32 is returned to the main tank 11 through the return passage 43, and the fuel passage 44 branched from halfway of the return passage 43 is connected to the auxiliary tank 15 through the control valve (normally-closed electromagnetic on-off valve) 20.

Therefore, to determine the self-ignition property (octane number) of the separated fuel within the first separated fuel tank 51, the blended fuel prepared by blending the separated fuel and the reference fuel at a predetermined ratio is injected by the first fuel injection valve 31 to operate the engine. Then, a knocking limit ignition timing of the blended fuel is measured to determine the self-ignition property of the separated fuel. After the determination is completed, the separated fuel having a known self-ignition property is stored in the auxiliary tank 15 from the return passage 43 through the control valve 20.

Therefore, to determine the self-ignition property (octane number) of the separated fuel within the second separated fuel tank 52, the blended fuel prepared by blending the separated fuel and the reference fuel at a predetermined ratio is injected by the second fuel injection valve 32 to operate the engine. Then, a knocking limit ignition timing of the blended fuel is measured to determine the self-ignition property of the separated fuel. After the determination is completed, the separation fuel having a known self-ignition property is stored in the auxiliary tank 15 from the return passage 43 through the control valve 20.

As a result, the self-ignition property of the separated fuel generated in an internal combustion engine which changes the fuel characteristic using the separating unit can be determined.

In case of separating to fuels of two or more kinds, or generating fuels having a relatively high self-ignition property and a relatively low self-ignition property, the self-ignition property of each fuel can be determined.

Figure 10:
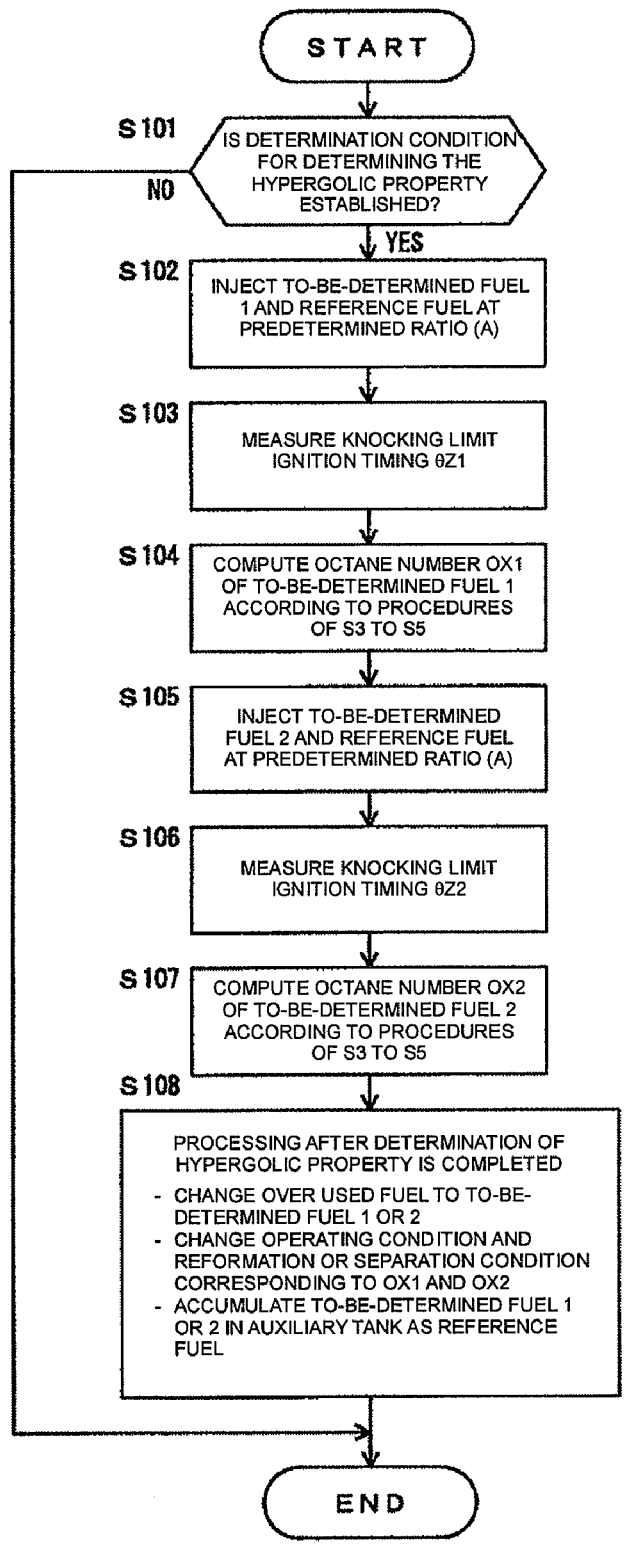
FIG. 10 is a flow chart of second fuel determination.

The procedure for determining the self-ignition property of two kinds of fuels, for example in the third embodiment and the fourth embodiment, will be described with reference to the flow chart in FIG. 10.

Figure 3:
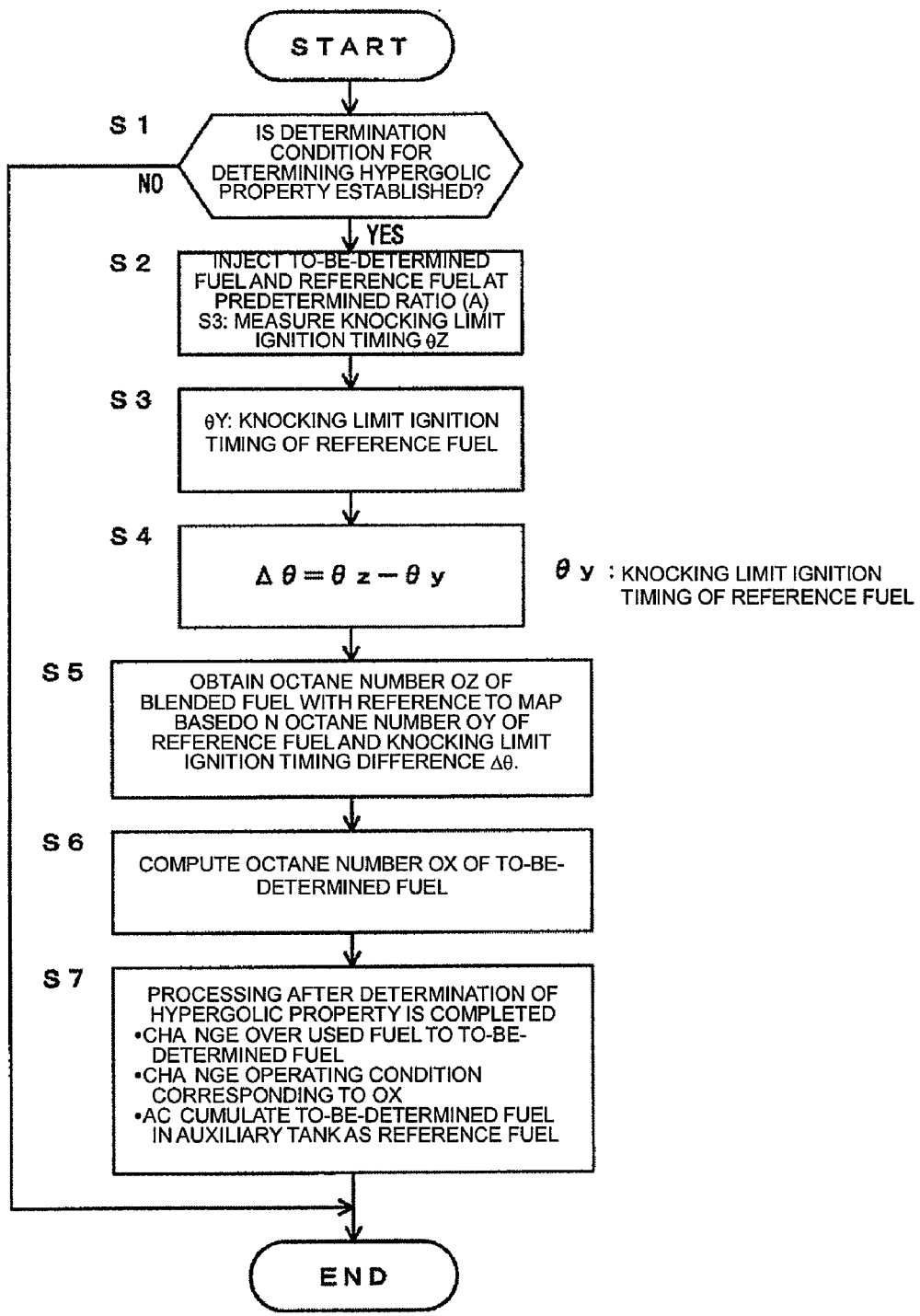
FIG. 3 is a flow chart for determination of the fuel self-ignition property.
Figure 4:
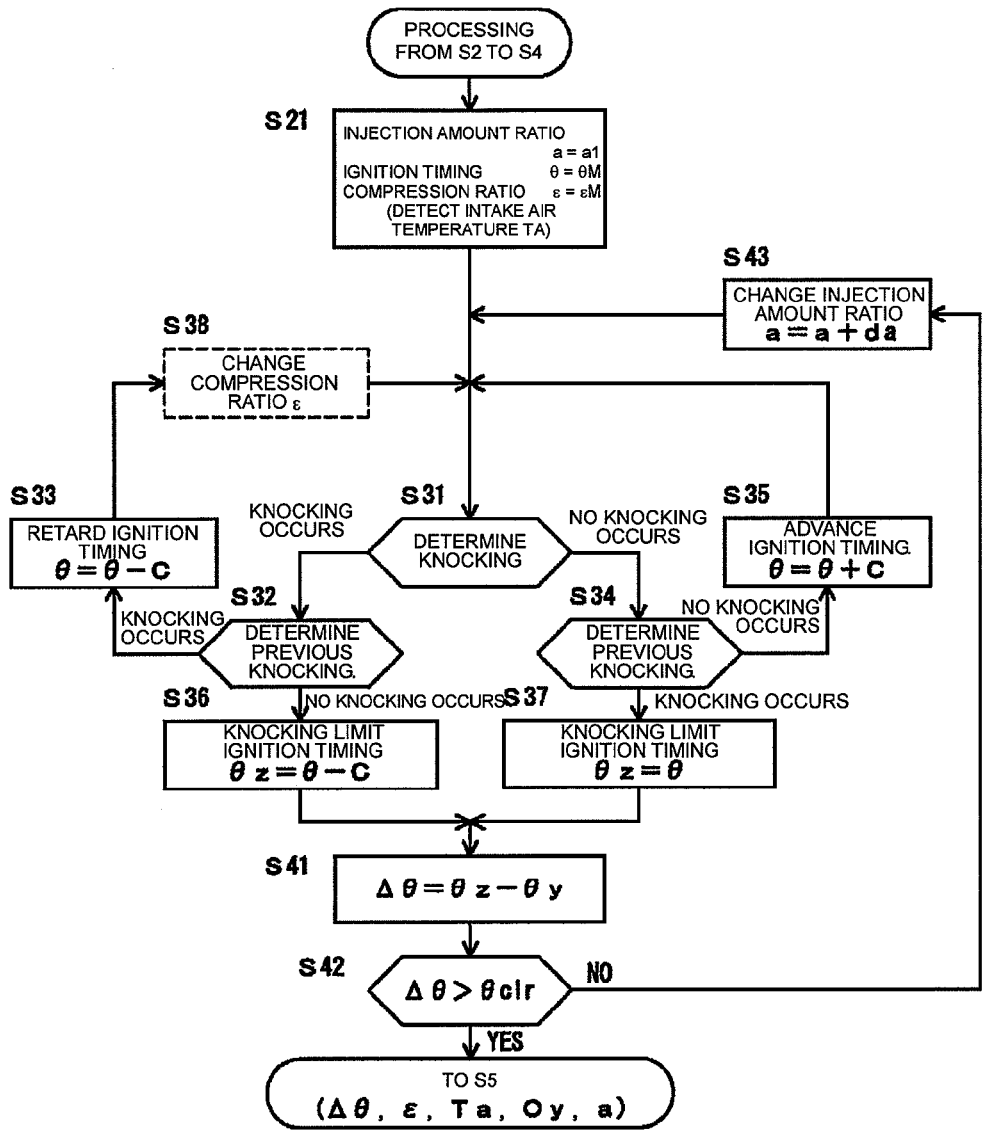
FIG. 4 is a detailed flow chart of portions of the flow in FIG. 3.

In step 101, it is determined whether or not the determination condition of the self-ignition property is established (whether or not a determination mode is selected) as in step 1 of FIG. 3. If the determination condition of the self-ignition property is established, the procedure proceeds to step 102.

In step 102, the to-be-determined fuel 1 (fuel in the first reformed fuel tank 36 or fuel in the first separated fuel tank 51) and the reference fuel in the auxiliary tank 15 are supplied at a predetermined ratio "a" from the first fuel injection valve 31 to the internal combustion engine 1 by injection.

In step 103, a knocking limit ignition timing θz1 is measured under an operation using the blended fuel of the to-be-determined fuel 1 and the reference fuel in step 102.

In step 104, an octane number Ox1 of the to-be-determined fuel 1 is calculated based on θz1 in the procedure of steps 3 to 5 of FIG. 3.

In step 105, the to-be-determined fuel 2 (fuel in the second reformed fuel tank 37 or fuel in the second separated fuel tank 52) and the reference fuel in the auxiliary tank 15 are supplied at a predetermined ratio "a" from the second fuel injection valve 32 to the internal combustion engine 1 by injection.

In step 106, a knocking limit ignition timing θz2 is measured under an operation using the blended fuel of the to-be-determined fuel 2 and the reference fuel in step 105.

In step 107, an octane number Ox2 of the to-be-determined fuel 2 is calculated based on θz2 in the procedure of steps 3 to 5 of FIG. 3.

When performing the determination of the self-ignition property of these two kinds of fuels serially, it is preferable to determine first the self-ignition property of the to-be-determined fuel 1 having a low self-ignition property (high octane number) and then determine the self-ignition property of the to-be-determined fuel 2 having a high self-ignition property (low octane number) from the viewpoint of safety.

The determination of the self-ignition property of the to-be-determined fuels 1, 2 has been completed and the procedure proceeds to step 108 (processing after the completion).

In step 108, as a processing after the completion, (1) the fuel for use is changed to the to-be-determined fuel 1 or 2; (2) the operating condition and reformation condition (operating condition of the reformers 34, 35) of the internal combustion engine 1 or the separation condition (operating condition of the separating unit 50) is changed according to the determined octane numbers Ox1 and Ox2; and (3) the to-be-determined fuel 1 or 2 is stored in the auxiliary tank 15 as the reference fuel.

Particularly, in case of the reformer, the operating condition of the reformer (e.g. amount of fuel supplied to the reformer, catalyst temperature) is feed-back controlled to secure a desired self-ignition property according to a determination result of the self-ignition property of the reformed fuel. Consequently, the efficiency of the reformer can be maximized.

Particularly, in case of the separating unit, the operating condition of the separating unit (e.g. applied pressure, temperature) is feed-back controlled to secure a desired self-ignition property according to a determination result of the self-ignition property of the separated fuel. Consequently, the efficiency of the separating unit can be maximized.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A spark-ignition type internal combustion engine, comprising:
a main tank for storing a to-be-determined fuel having an unknown self-ignition property;
an auxiliary tank for accumulating a reference fuel having a known self-ignition property; and
a controller programmed to:
supply to a combustion chamber a blended fuel prepared by blending the to-be-determined fuel and the reference fuel at a predetermined ratio;
measure a self-ignition property of the blended fuel;
determine the unknown self-ignition property of the to-be-determined fuel based on the measured self-ignition property of the blended fuel, the known self-ignition property of the reference fuel and the ratio of the blended fuel; and
introduce the to-be-determined fuel after the determination from the main tank to the auxiliary tank, and store the to-be-determined fuel in the auxiliary tank such that the to-be-determined fuel serves as a next reference fuel having a known self-ignition property.

2. The spark-ignition type internal combustion engine according to claim 1, wherein the self-ignition property of the blended fuel is measured based on a knocking limit ignition timing of the blended fuel.

3. The spark-ignition type internal combustion engine according to claim 1, wherein the self-ignition property of the blended fuel is measured based on a difference between a knocking limit ignition timing of the blended fuel and a knocking limit ignition timing of the reference fuel.

4. The spark-ignition type internal combustion engine according to claim 3, wherein if the difference between the knocking limit ignition timing of the blended fuel and the knocking limit ignition timing of the reference fuel is a predetermined value or less, the ratio of to-be-determined fuel in the blended fuel is increased.

5. The spark-ignition type internal combustion engine according to claim 2, further comprising:
a variable compression ratio mechanism that changes a compression ratio; and
a controller programmed to:
measure the knocking limit ignition timing of the blended fuel by changing the ignition timing; and
if the knocking is not eliminated by retarding the ignition timing, change the compression ratio by the variable compression ratio mechanism.

6. The spark-ignition type internal combustion engine according to claim 1, wherein after the self-ignition property of the to-be-determined fuel is determined, only the to-be-determined fuel is supplied to a combustion chamber by gradually increasing the ratio of the to-be-determined fuel in the blended fuel.

7. The spark-ignition type internal combustion engine according to claim 1, wherein the blended fuel is supplied to the combustion chamber with an injection valve for the to-be-determined fuel to inject the to-be-determined fuel, and an injection valve for the reference fuel to inject the reference fuel.

8. The spark-ignition type internal combustion engine according to claim 1, wherein the blended fuel is supplied to the combustion chamber with an injection valve for injecting the blended fuel prepared by blending the to-be-determined fuel and the reference fuel at a predetermined ratio.

9. The spark-ignition type internal combustion engine according to claim 1, wherein whether or not fuel is supplied to the main tank is determined, and
when the engine is started after it is determined that the fuel is supplied, the self-ignition property of the to-be-determined fuel is determined.

10. The spark-ignition type internal combustion engine according to claim 9, wherein an amount of the fuel in the main tank is measured, and
a determination that the fuel is supplied to the main tank is made if a difference between the amount of the fuel in the main tank when the engine is started and the amount of the fuel in the main tank when the engine is stopped exceeds a predetermined amount.

11. The spark-ignition type internal combustion engine according to claim 9, wherein whether or not the fuel is supplied to the main tank is determined by detecting a flow of the fuel to a supply port of the main tank.

12. The spark-ignition type internal combustion engine according to claim 1, further comprising:
   a reformer which introduces the fuel in the main tank and reforms the fuel;
   a reformed fuel tank for storing the reformed fuel reformed by the reformer; and
   a controller programmed so that the to-be-determined fuel is the reformed fuel and the self-ignition property of the reformed fuel is determined.

13. The spark-ignition type internal combustion engine according to claim 12, wherein the reformer reforms to two kinds of fuels respectively having a relatively high self-ignition property and a relatively low self-ignition property.

14. The spark-ignition type internal combustion engine according to claim 13, wherein after the self-ignition property of the reformed fuel having a low self-ignition property is determined, the self-ignition property of the reformed fuel having a high self-ignition property is determined.

15. The spark-ignition type internal combustion engine according to claim 1, further comprising:
   a separating unit which introduces the fuel in the main tank and separates the fuel to at least two kinds of fuels;
   at least two separated fuel tanks for accumulating the separated fuels separated by the separating unit, respectively; and
   a controller programmed so that the to-be-determined fuel is the separated fuel and the self-ignition property of the separated fuel is determined.

16. The spark-ignition type internal combustion engine according to claim 15, wherein the separating unit separates to two kinds of fuels respectively having a relatively high self-ignition property and a relatively low self-ignition property.

17. The spark-ignition type internal combustion engine according to claim 16, wherein after the self-ignition property of the separated fuel having a low self-ignition property is determined, the self-ignition property of the separated fuel having a high self-ignition property is determined.

18. The spark-ignition type internal combustion engine according to claim 7, wherein the injection valve for the to-be-determined fuel is disposed in an intake passage and the injection valve for the reference fuel is disposed in the combustion chamber.

19. A fuel property determining method for a spark-ignition type internal combustion engine, the engine including a main tank for storing a to-be-determined fuel having an unknown self-ignition property and an auxiliary tank for accumulating a reference fuel having a known self-ignition property, the method comprising:
   supplying to a combustion chamber a blended fuel prepared by blending the to-be-determined fuel having the unknown self-ignition property and the reference fuel having the known self-ignition property at a predetermined ratio;
   measuring a self-ignition property of the blended fuel; and
   determining the unknown self-ignition property of the to-be-determined fuel based on the measured self-ignition property of the blended fuel, the known self-ignition property of the reference fuel and the ratio of the blended fuel.

20. A spark-ignition type internal combustion engine, comprising:
   a main tank for storing a to-be-determined fuel having an unknown self-ignition property;
   an auxiliary tank for accumulating a reference fuel having a known self-ignition property;
   means for supplying to a combustion chamber a blended fuel prepared by blending the to-be-determined fuel and the reference fuel at a predetermined ratio;
   means for measuring a self-ignition property of the blended fuel;
   means for determining the unknown self-ignition property of the to-be-determined fuel based on the measured self-ignition property of the blended fuel, the known self-ignition property of the reference fuel and the ratio of the blended fuel; and
   means for introducing the to-be-determined fuel after the determination from the main tank to the auxiliary tank and storing the to-be-determined fuel in the auxiliary tank such that the to-be-determined fuel serves as a next reference fuel having a known self-ignition property.

* * * * *